G. C. TEWKSBURY,
Assignor to TEWKSBURY AUTOMATIC ELEVATOR COMPANY.
ELEVATOR STOP.
No. 10,192. Reissued Aug. 29, 1882.
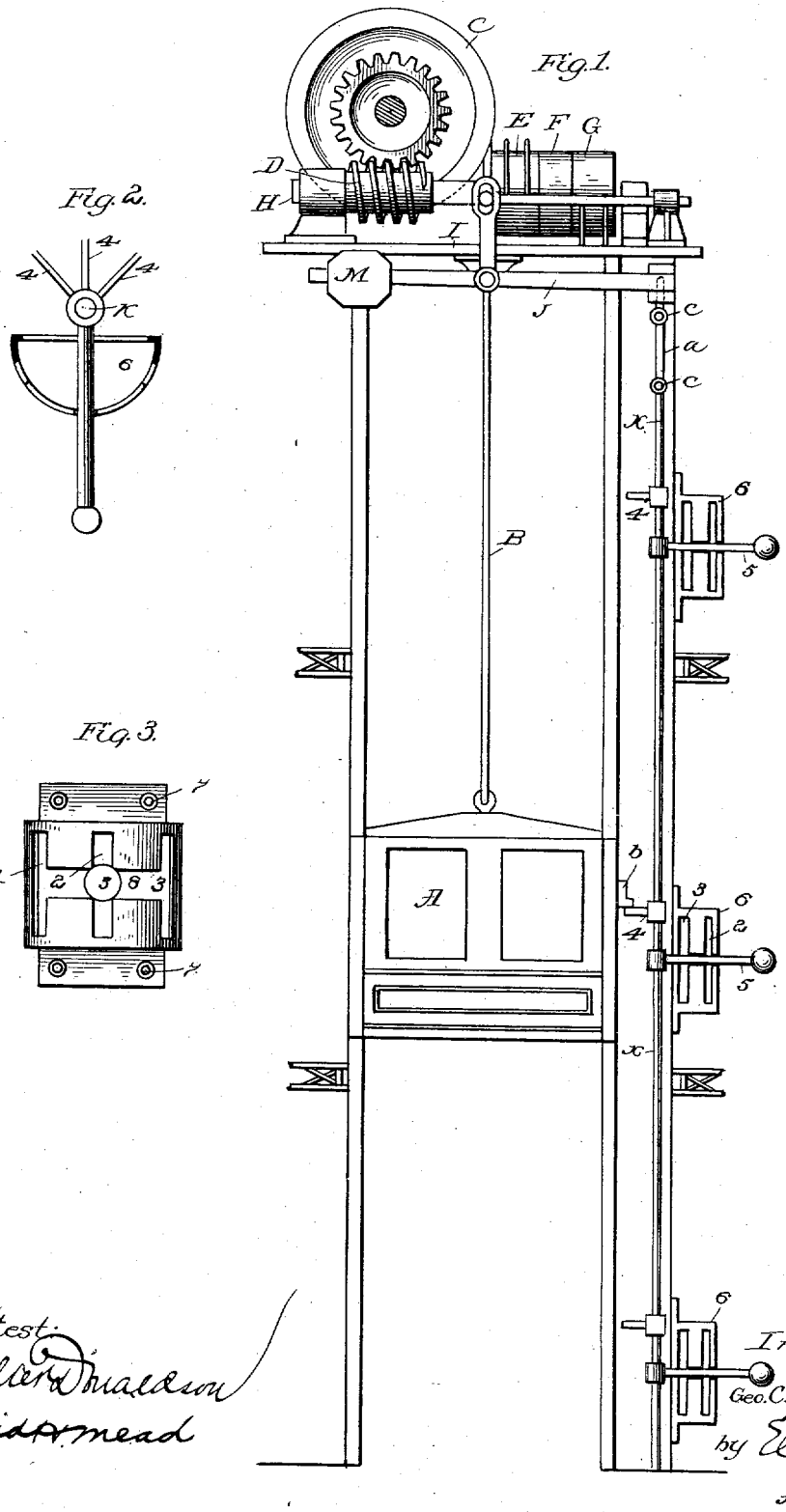
N. PETERS, Photo-Lithographer, Washington, D. C.

UNITED STATES PATENT OFFICE.

GEORGE C. TEWKSBURY, OF NEWARK, NEW JERSEY, ASSIGNOR TO TEWKSBURY AUTOMATIC ELEVATOR COMPANY, OF NEW JERSEY.

ELEVATOR-STOP.

SPECIFICATION forming part of Reissued Letters Patent No. 10,192, dated August 29, 1882.

Original No. 255,050, dated March 14, 1882. Application for reissue filed August 3, 1882.

*To all whom it may concern:*

Be it known that I, GEORGE C. TEWKSBURY, of Newark, county of Essex, State of New Jersey, have invented certain new and useful Improvements in Elevators; and I do hereby declare that the following is a full, clear, and exact description of the same.

My invention relates to elevators; and the objects of my improvement are, first, to provide means whereby the ascent or descent of the elevator may be automatically stopped at any given point or apartment between the two extreme ends of its journey; and, secondly, to provide means whereby the operator at any point or station may, when shipping the elevator-box, determine the point in either direction where it shall automatically stop. I attain these objects by the mechanism illustrated in the accompanying drawings, in which—

Figure 1 is a front elevation of an elevator embodying my invention. Fig. 2 is a sectional plan of the stopping mechanism. Fig. 3 is a front elevation of the shipping-indicator.

The elevator-box A, cord B, drum C, worm D, pulleys E F G, shaft H, and shipping-levers I J are all constructed and combined to operate in the usual manner.

Connected with the bell-crank lever J is a vertical rod, K, which extends the entire length of the elevator-well, and by this means communication with the driving-belts attached to the pulleys E F G may be had at any and every point throughout the entire journey of the elevator-box, the bell-crank lever operating the belt-shifting device over the pulleys in the ordinary manner. Said rod K slides in suitable bearings secured to the walls of the building, and is swiveled to the lever J, so as to admit of the rotary movement hereinafter described. A movement of the rod K upward or downward changes the position of the belts upon the pulleys E F G, and in this manner the elevator is set in motion in one direction or the other, or the movement thereof is arrested whenever occasion requires. To avoid binding, the rod K is provided with a link, *a*, and joints *c c*. The weight of the rod K is balanced by counter-weight M, arranged upon an extension of the lever J.

Attached to the elevator-box A is a dog, *b*, which, by coming in contact with pins 4, hereinafter described, moves the rod K up or down, according to the direction of the movement of the said elevator-box, and in this manner the driving-belts are shifted off the driving-pulley F onto loose pulley E G, whereupon the elevator stops.

The rod serves as a connection between the belt-shifting devices and the box, at whatever station the box may be.

The pins 4 are set upon the rod K—one at each floor, apartment, or station; but the pins do not project in the same vertical plane, but diverge, as shown in Fig. 2, so that by turning the rod K any one of the pins may be brought into line with the dog *b*, while all the other pins are out of such line.

Whenever the car is to be stopped at any given floor, the pin at the pivot is set by the turning of the rod K in line with the dog. Then, if the car or box be rising or descending, the dog thereon will strike the pin and lift the rod K and shift the belt from the fixed to a loose pulley and stop the car or box.

Upon the rod K are handles 5, arranged one at each apartment, by which the elevator passes, and by grasping this handle the operator (in order to set the elevator-box in motion) has only to slide the rod K up or down, thereby shifting the belt from a loose to the fixed pulley. Also, by moving the handle horizontally he may turn the rod K so as to bring the pin of any particular apartment into line with the dog *b*, thus insuring a cessation of movement whenever the elevator reaches that point.

At each of the handles 5 is provided an indicator, which consists of a semicircular case, 6, secured to the wall of the building by means of screws 7, and perforated with slots 1 2 3, as shown in Fig. 3. A horizontal slot, 8, enables the handles 5 to be turned horizontally to bring the pin in line and the handle to come in communication with each of the slots 1 2 3. The number of vertical slots 1 2 3 is made to correspond with the number of apartments or points at which it is desired the elevator should be allowed to stop, there being a vertical slot for each floor. In each of the cases the slot is marked with the number of that floor or station.

The pins 4 are so set in relation to the slots and handle 5 that when said handle is over any given slot the pin for the station appropriate to that slot is in line with the dog *b*, and the box or car will automatically strike that pin and carry the rod K along till the belt is shifted to a loose pulley, and the box then stops. The slots allow the handles to rise or fall.

From the foregoing it must be evident that if the operator desires the elevator to stop at a given point—for example, at the second story—he has only to turn the handle 5 into line with the slot which bears that number upon the indicator and then push the rod K up or down, according to the direction in which he desires the elevator should go, and when the elevator reaches the given point the dog *b*, operating upon the pin at that point, will move the rod, shift the belts to the loose pulleys, and stop the elevator. This may be done at any floor or station for any other floor or station, so that a person on any floor can send the box from any floor to any other floor and cause it to stop there until moved to some other.

Having described my invention, what I claim as new, and desire to secure by Letters Patent, is—

1. In combination with an elevator, a shifting device adapted to change the direction of the box or to arrest the same, and an automatic stop mechanism adapted to be set at any given station or floor for any other station or floor, and to be acted on by the box to arrest the same when it reaches that point, all substantially as described.

2. In an elevator, a driving mechanism, devices for shifting such mechanism, whereby the box may be raised, lowered, or stopped, and a starting and automatic stop mechanism adapted to be set at any station or floor for any other, to start the box and to arrest the same when it reaches the designated point, substantially as described.

3. In an elevator, a driving mechanism, devices for shifting such mechanism, whereby the box may be raised, lowered, or stopped, and a rod connecting to said shifting devices, extending up and down in the elevator-well, in combination with handles and pins on said rod, and a dog on the elevator-box, whereby the apparatus may be set on any floor for any other and the box automatically operate the shifting devices and stop, substantially as described.

4. The combination of the lever I J, pivoted as shown, the pulleys E F G, and the intermediate belt-shifting devices, the vertically-sliding rod *k*, and the handles 5 5 5, arranged at different points on the shaft, and provided with suitable locking mechanisms, substantially as described.

5. In combination with a connecting-rod, K, provided with handles 5 and suitable projecting pins, 4, an indicator, substantially as set forth, whereby the position of said pins may be regulated, as and for the purposes described.

GEO. C. TEWKSBURY.

Witnesses:
J. M. BADGER,
J. W. TEWKSBURY.